United States Patent [19]

Esler

[11] 4,215,776
[45] Aug. 5, 1980

[54] BELT CONVEYOR IDLER

[75] Inventor: Thomas C. Esler, New Philadelphia, Ohio

[73] Assignee: Joseph M. Stofan, Dover, Ohio ; a part interest

[21] Appl. No.: 850,217

[22] Filed: Nov. 10, 1977

[51] Int. Cl.² .................. B65G 15/08; B65G 15/60
[52] U.S. Cl. ............................... 198/823; 198/840; 198/841
[58] Field of Search ............... 198/823, 837, 840, 841

[56] References Cited

U.S. PATENT DOCUMENTS

| | | | |
|---|---|---|---|
| 2,702,115 | 2/1955 | Cunningham | 198/823 X |
| 2,710,683 | 6/1955 | McClenny | 198/841 X |
| 2,921,668 | 1/1960 | Risse | 198/837 X |
| 3,360,105 | 12/1967 | Pelzer | 198/837 X |
| 3,788,457 | 1/1974 | Valentino | 198/836 |
| 3,885,837 | 5/1975 | Mellor | 198/841 X |
| 3,955,668 | 5/1976 | Buschbom et al. | 198/841 X |
| 4,008,801 | 2/1977 | Reilly et al. | 198/841 |

FOREIGN PATENT DOCUMENTS 2416775 10/1975 Fed. Rep. of Germany ............ 198/841

458676 12/1936 United Kingdom ..................... 198/837

*Primary Examiner*—James L. Rowland
*Attorney, Agent, or Firm*—Frease & Bishop

[57] ABSTRACT

A belt conveyor idler has a rigid U-shaped channel which is fixedly mounted on a pair of spaced supports. A rigid strip of a low-friction material, such as a high molecular weight polyethelene, is fixedly mounted within the channel and extends transversely across the path of a conveyor belt for slidably supporting the conveyor belt. The channel and strip of low-friction material each have a complementary catenary configuration for the load-bearing troughing run of the conveyor belt, and a straight horizontal configuration for the return run of the belt. Belt retainer blocks are formed of the same low-friction material as the channel strip and are mounted on the ends of the channel strip to prevent excess sideways movement of the belt. The low-friction strips may be formed with a plurality of transverse slots to reduce the contact surface between the belt and strips. The idlers for both the troughing and return belt runs are free of any moving parts, yet provide a low-friction support for the conveyor belt.

12 Claims, 18 Drawing Figures

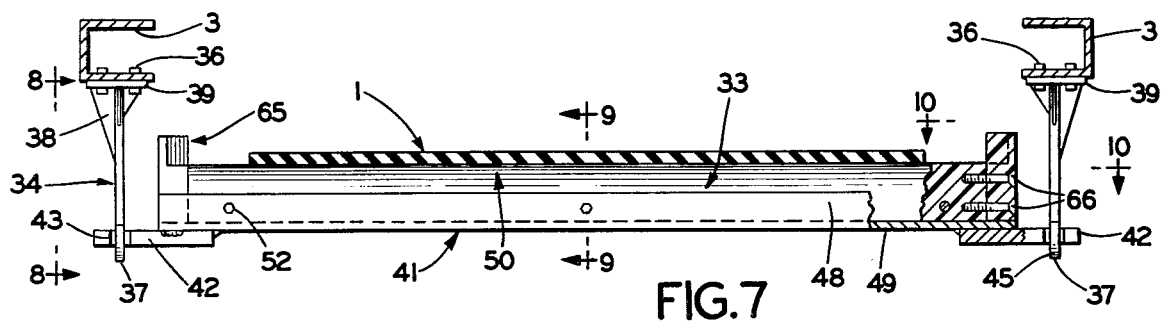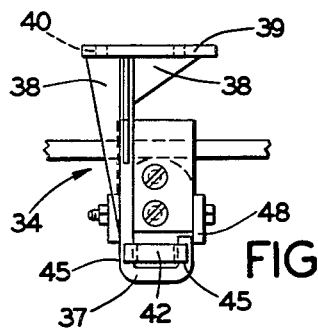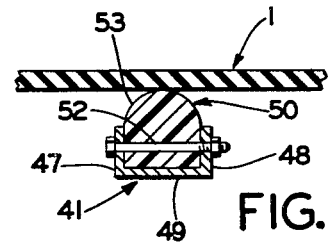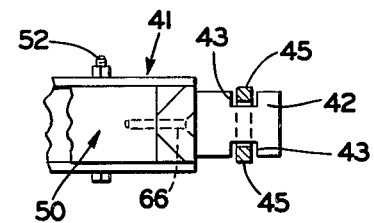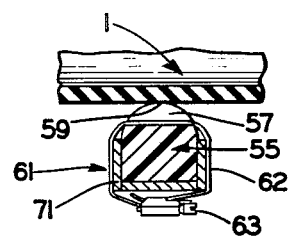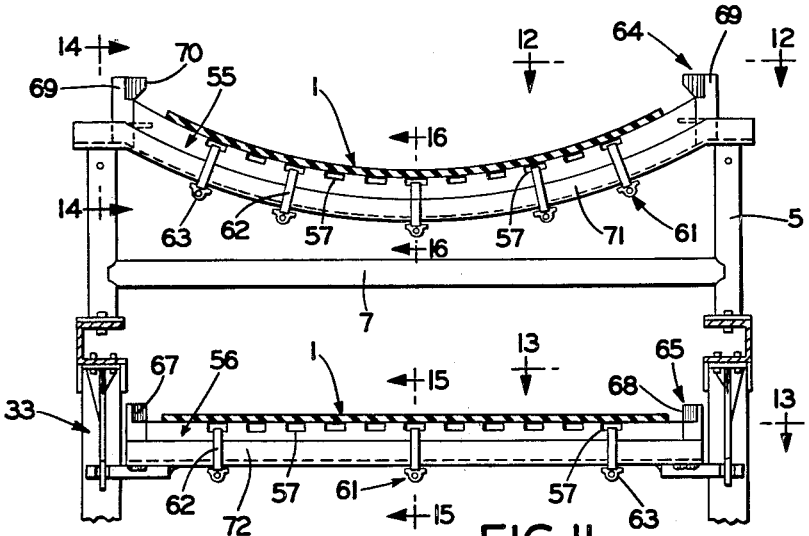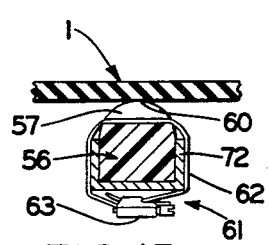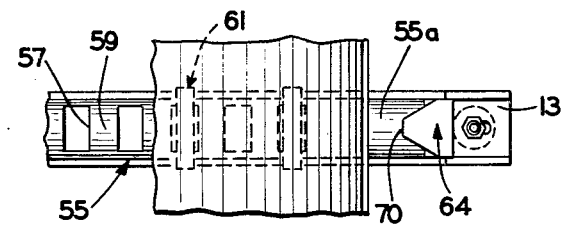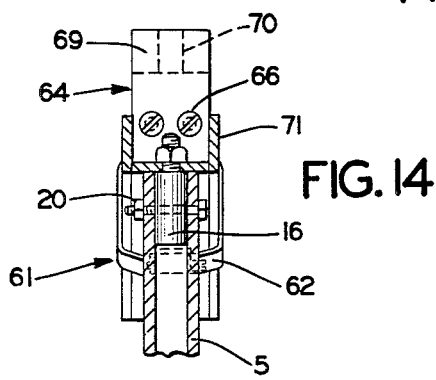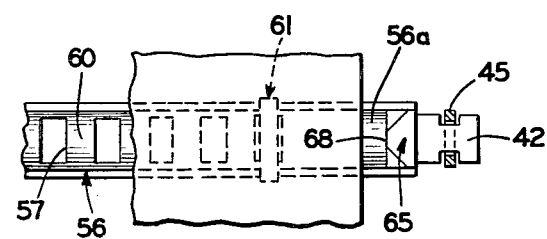

BELT CONVEYOR IDLER

BACKGROUND OF THE INVENTION

1. Field of the Invention

The invention relates to a belt conveyor and particularly to a continuous belt type having a trough-shaped upper run and a horizontal return run. More particularly the invention relates to an idler construction for such conveyors which has a low-friction belt supporting surface that is free of moving parts and highly resistant to wear and corrosion.

2. Description of the Prior Art

Belt conveyors are used in numerous installations for conveying articles between stations in which the belt is an endless loop with power-driven rollers for moving the belt located at one or both ends of the conveyor. A plurality of idlers are spaced longitudinally along the path of the belt between the power-driven roller or rollers for slidably supporting both the upper troughing load-bearing run of the belt and the lower return run of the belt.

Many of these idlers use a belt engaging member for the upper run which is flexible and which conforms to the catenary configuration of the belt. The ends of these supporting members are rotatably mounted in bearings, trunnions or other mechanisms. These mountings must be continuously lubricated to enable the idler member to rotate freely in order to provide a low-friction support for the belt so that the belt may be driven smoothly, quietly and with minimum friction to reduce the power requirements of the conveyor system and to increase the amount of load which can be carried by the conveyor.

Such continuous belt conveyors are used extensively in extremely corrosive and in high-pollution environments such as coal and salt mines, steel mills, sanitary disposal plants and the like. Such environment requires continuous lubrication and maintenance of the bearings or idler supports to permit their smooth operation. These conditions increase considerably the initial cost of the conveyor system due to the expensive bearings or other support members required to withstand such conditions, as well as increasing the amount of maintenance required to insure their continuous smooth running operation. Also, the bearings must be replaced periodically with new bearings due to this corrosive environment, which replacement increases the cost of the conveyor system.

Various conveyor constructions have been developed in an attempt to reduce these problems in which the bearings, which are the main problems, are eliminated from the idler. One example of such a construction is shown in U.S. Pat. No. 2,702,115 in which an oil-filled sleeve is rotatably mounted on an internal bar. The bar is preformed with a catenary configuration and is fixedly mounted on its ends to a supporting structure. Other conveyor constructions such as shown in U.S. Pat. Nos. 2,866,538, 3,265,192, 3,311,222 and 3,885,837 are formed with a strip or strips of low-friction materials which extend longitudinally along the edges or midpoints of the moving conveyor element to provide a low-friction, load-supporting surface.

Other constructions, such as shown in U.S. Pat. Nos. 3,491,873, 3,603,450, 3,788,457 and 4,008,801, use low-friction strips as side guide rails or as actual portions of the lower belt surfaces in order to reduce the friction between the belt and/or article being conveyed and the supporting members. U.S. Pat. No. 3,955,668 discloses another type of conveyor having a continuous load-supporting pan or base with a plurality of longitudinally spaced, transversely-extending, low-friction strips located between adjacent base sections to assist in reducing the belt friction.

Most of these constructions are intended for use in applications having relatively short conveyor runs for carrying a particular type of material or article requiring a continuous rigid support over which a belt moves in transporting such materials. These particular conveyor constructions generally are not intended for use in harsh environments and for extremely long belt runs as found in mines and similar locations due to their expensive construction and configurations.

Accordingly, the need has existed for a belt conveyor idler which is extremely simple and inexpensive in construction, which provides a low-friction support for the upper and lower belt runs, which is free of moving parts, and which requires no lubrication for its operation.

SUMMARY OF THE INVENTION

Objectives of the invention include providing an idler construction for a belt conveyor formed of a few relatively simple components; namely, a rigid channel in which a strip of low-friction material is seated which in turn is supported on or suspended from a usual belt conveyor bracket; providing such an idler construction which is free of any moving parts and which requires no external lubrication in order to provide a low-friction surface for slidably supporting both the load bearing troughing run and return run of the conveyor; providing such an idler construction in which the strip of low-friction material can be replaced easily and conveniently if necessary, and which may be provided with a belt retaining block on each end of the strip to prevent excess sideways movement of a conveyor belt; providing such an idler construction which supports a conveyor belt across its entire width without sharp angles or projections, which is relatively maintenance free due to the absence of moving parts, which is highly corrosive resistent and unaffected by most chemicals, water and surrounding pollutants, which increases belt life because of its low coefficient of friction, and which is light-weight in construction; providing such an idler construction which can be adapted for use with most known existing types of belt conveyor systems since various types of mounting brackets and supports can be installed on the ends of the low-friction strip mounting channel; and providing such an idler construction which eliminate difficulties heretofore encountered, achieves the stated objectives simply, efficiently and economically, and solves problems and satisfies existing needs.

These objectives and advantages are obtained by the idler construction for a belt conveyor, the general nature of which may be stated as including a rigid channel means adapted to extend transversely across the path of a conveyor belt; bracket means supporting the channel means in a fixed nonrotatable position; a strip of a rigid low-friction material mounted on the channel means and extending generally throughout the length of the channel means; the low-friction strip having a rounded top surface adapted to slidably support the conveyor belt; belt retainer blocks formed of a low-friction material mounted on the ends of the low-friction strip for preventing excess sideways movement of the belt; and the channel and strip of low-friction material, each having a complementary catenary configuration.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 7 is an enlarged fragmentary sectional view with portions broken away and in section showing the bottom run portion of the conveyor shown in FIG. 2;

FIG. 8 is an enlarged fragmentary end elevational view looking in the direction of arrows 8—8, FIG. 7;

FIG. 9 is an enlarged fragmentary sectional view taken on line 9—9, FIG. 7;

FIG. 10 is an enlarged fragmentary sectional view taken on line 10—10, FIG. 7;

FIG. 11 is a fragmentary sectional view similar to FIG. 2, showing a modified form of the improved idler construction;

FIG. 12 is an enlarged fragmentary top plan view looking in the direction of the arrows 12—12, FIG. 11;

FIG. 13 is an enlarged fragmentary sectional view taken on line 13—13, FIG. 11;

FIG. 14 is an enlarged fragmentary sectional view taken on line 14—14, FIG. 11;

FIG. 15 is an enlarged fragmentary sectional view taken on line 15—15, FIG. 11;

FIG. 16 is an enlarged fragmentary sectional view taken on line 16—16, FIG. 11.

Similar numerals refer to similar parts throughout the drawings.

DESCRIPTION OF THE PREFERRED EMBODIMENT

Figure 1:
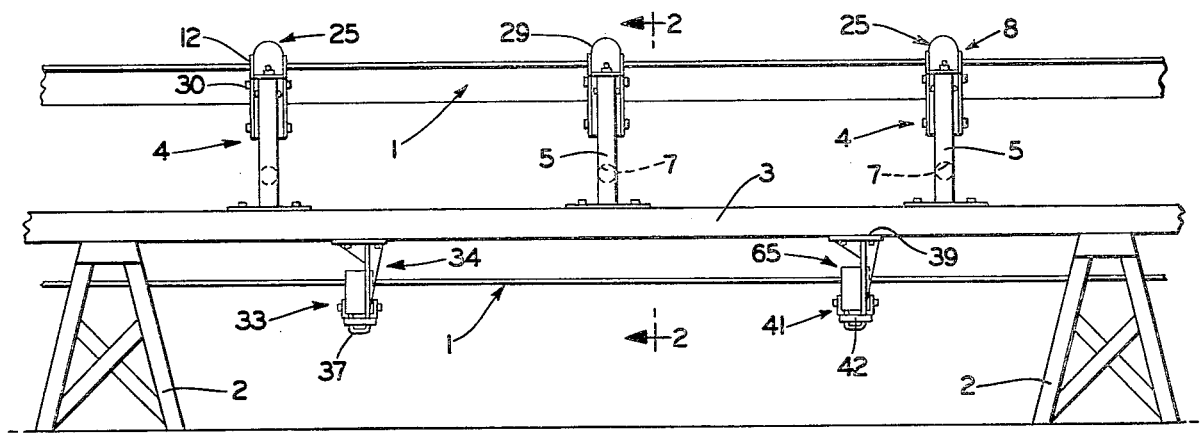
FIG. 1 is a fragmentary, somewhat diagrammatic, side elevational view of a belt conveyor using the improved idler construction of the invention.
Figure 2:
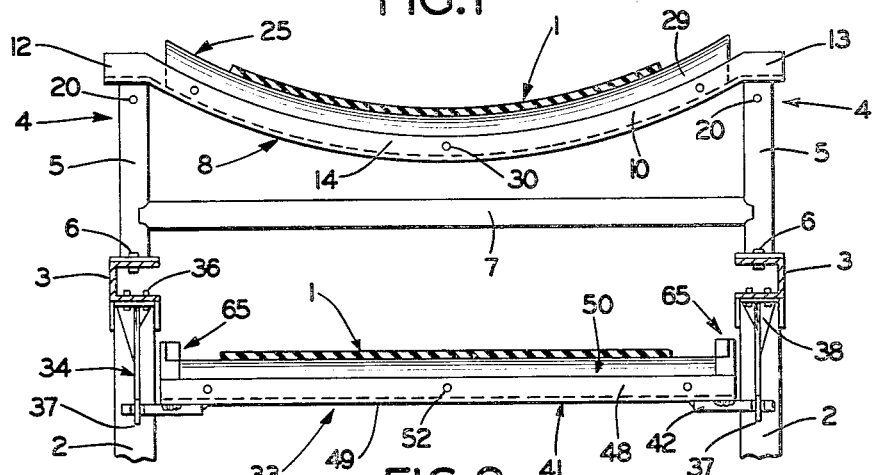
FIG. 2 is an enlarged fragmentary sectional view taken on line 2—2, FIG. 1.

A portion of a usual endless belt conveyor system of the type in which the improved idler construction is to be incorporated, is shown in FIG. 1. An endless conveyor belt 1 is power driven by rollers (not shown), usually mounted at the ends of the conveyor system. These conveyor systems and belts may extend considerable distances, as much as several thousands feet with a single continuous belt. A plurality of supports 2 are positioned longitudinally along the conveyor path for supporting a pair of spaced support channels 3, as shown in FIG. 2. Channels 3 extend generally throughout the length of and parallel with the conveyor belt.

A plurality of troughing idler assemblies, indicated generally at 4, are spaced longitudinally along the length of the conveyor for supporting the upper troughing run of the conveyor belt and the load being carried thereby. Troughing idler assemblies 4 are similar. Therefore, only one is described in detail and illustrated in the drawings.

Assembly 4 includes a pair of spaced vertical posts 5 (FIG. 2) which are attached by bolts 6 to channels 3. A horizontal reinforcing bar 7 extends between and is attached to the lower ends of posts 5. Posts 5, reinforcing bar 7 and the attachment means to channels 3 may have various arrangements and configurations than that shown in the drawings without affecting the concept of the invention.

Figure 3:
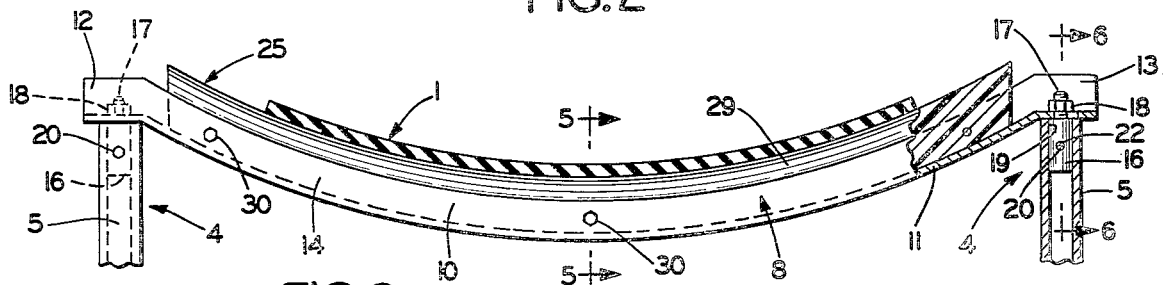
FIG. 3 is an enlarged fragmenary view, with portions broken away and in section, of the upper troughing load-bearing run portion of the conveyor shown in FIG. 2.
Figure 4:
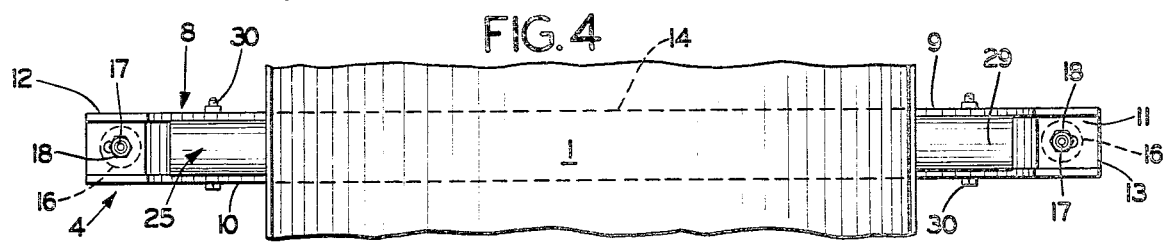
FIG. 4 is a fragmentary top plan view of the conveyor troughing run of FIG. 3.
Figure 5:
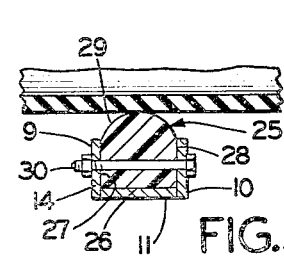
FIG. 5 is an enlarged fragmentary sectional view taken on line 5—5, FIG. 3.
Figure 6:
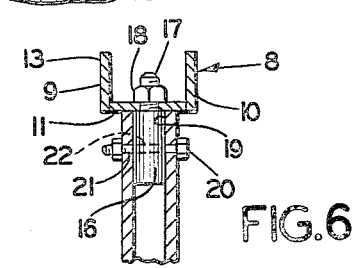
FIG. 6 is an enlarged fragmentary sectional view taken on line 6—6, FIG. 3.

A rigid channel 8 is mounted on the upper ends of posts 5 and extends therebetween transversely across the path of the conveyor (FIGS. 2, 3 and 4). Channel 8 preferably has a U-shaped cross-sectional configuration, as shown in FIGS. 5 and 6, formed by a pair of spaced vertical legs 9 and 10 and a connecting web or bottom wall 11. Channel 8 includes a pair of horizontal end segments 12 and 13 and a main curved central segment 14. Segment 14 has a catenary configuration complementary to the catenary curve of conveyor belt 1. Channel 8 preferably is formed by three individual sheet metal strips which form legs 9-10 and web 11. These strips are formed individually to the catenary configuration and horizontal end segment shapes and then welded together to form the final U-shaped cross-sectional configuration.

In accordance with one of the main features of the invention, channel 8 is firmly fixed to post 5 so as to be free of any rotation or pivotal movement with respect thereto. One type of attachment means consists of a cylindrical pin 16 having a threaded upper end 17 which is attached to the bottom of web 11 of the horizontal end segments 12 and 13 by nuts 18. Pins 16, which project vertically downwardly from end segments 12 and 13, are telescopically received within openings 19 formed in the top ends of posts 5. Pins 16 may be secured in posts 5 by a bolt 20, which extends through a pair of aligned openings 21 formed in the upper ends of posts 5 and through an opening 22 formed in pin 16.

A strip of low-friction material, indicated at 25, is mounted on channel 8. Strip 25 (FIG. 5) has a rectangular cross-sectional lower portion defined by a bottom surface 26 and a pair of vertical side surfaces 27 and 28. Surfaces 27-28 are connected by a convexly-curved, smooth, rounded top surface 29. The dimensions and configurations of bottom and side surfaces 26-28 are complementary to the inner dimensions and configurations of the U-shaped configuration of channel 8 so as to be slidably received therein, with rounded top surface 29 projecting upwardly above the tops of channel legs 9 and 10. A plurality of bolts 30 (FIGS. 3 and 5) extend through aligned openings formed in channel legs 9 and 10 and the lower portion of strip 25 to removably mount strip 25 on channel 8. Strip 25 has a smooth, curved concave configuration intended to stimulate the catenary curve of conveyor belt 1 and complementary to the curve of central channel segment 14.

Strip 25 is formed of an ultra-high molecular weight (UHMW) polymer, preferably polyethylene. One type of UHMW polyethylene found suitable for strip 25 is sold by Poly-Hi, Inc. of Fort Wayne, Ind., under its identification numbers TIVAR-88 and TIVAR-100, with TIVAR-88 being the preferred material of the two. Another example of such material is sold by Impact Plastics, Inc. of Castonia, N.C. under its trademark, Impax. Such UHMW polyethylene preferably has a density in the range of 0.930–0.965 gr/cc; a yield tensile strength in the range of 3,000–3,400 psi and an ultimate tensile strength in the range of 5,600–6,400 psi, with a yield elongation percentage range of 10–16 and a break elongation percentage in the range of 300–370; a Rockwell hardness ("R" Scale) of 50–70; and a coefficient of friction in the range of 0.10–0.20. Preferably this strip material has a density of 0.960–0.965, a yield tensile strength of 3,300 psi; and an ultimate tensile strength of 5,600 psi, with a yield elongation percentage of 14 and a break elongation percentage of 334, a Rockwell hardness ("R" Scale) of 70, and a coefficient of friction of 0.11. This UHMW polyethylene material has an extremely high abrasive resistance, is impervious to water absorption, is relatively uneffected by most chemical contaminants present in environments in which such conveyor systems are generally used, and is self-lubricating.

A plurality of return idler assemblies, indicated generally at 33 (FIGS. 1–2 and 7–10), also are mounted on support channels 3 and spaced longitudinally along the conveyor run for slidably supporting the return run of the conveyor belt. Each assembly 33 includes a suspension bracket 34 which is mounted on the bottom of support channels 3 by a plurality of bolts 36. Suspension bracket 34 includes a J-hook 37 which is secured by triangular flanges 38 to a base plate 39 (FIG. 8). Bolts 36 extend through holes 40 which are formed in base plate 39 for mounting suspension brackets 34 on channel 3.

A rigid channel member 41 is suspended from and extends between suspension brackets 34 by a pair of horizontal end plates 42. Plates 42 have a pair of notches 43 formed therein into which the legs 45 of J-hooks 37 extend for mounting channel member 41 on brackets 34. Channel member 41 has a U-shaped cross-sectional configuration (FIG. 9) formed by a pair of vertical legs 47 and 48 and a web 49. Channel member 41 has a straight horizontal configuration since the return run of the conveyor belt has no load being supported thereby.

A strip of low-friction material 50, having a bottom portion similar in cross-section to the internal U-shaped cross-sectional configuration of channel member 41, is mounted therein by a plurality of bolts 52 (FIG. 9). Strip 50 has a smooth, curved convex top surface 53 which projects upwardly beyond the tops of channel legs 47 and 48. Strip 50 is similar in cross-sectional configuration to strip 25 of troughing idler assembly 4 and preferably is formed of the same UHMW polymer material as that of strip 25. The main difference between strip 50 and strip 25 is the straight horizontal configuration of strip 50 for the return run of the conveyor belt in contrast to the catenary configuration of troughing strip 25.

A modified form of the troughing and return idler assemblies is shown in FIG. 11. In this modification the troughing and horizontal low-friction strips of materials, indicated at 55 and 56, respectively, are formed with a plurality of slots or grooves 57. Grooves 57 are formed in the rounded top surfaces 55a and 56a of strips 55 and 56, in a transverse direction with respect to the longitudinal axis of the strips so as to form a plurality of longitudinally spaced rounded convex top surface areas 59 and 60 along the strips throughout a large portion of the central areas of the strips. Grooves 57 preferably are located sufficiently within the lateral edges of belt 1 so that the belt edges will not have a tendency to catch in the grooves upon sideways movement of the belt.

Strips 55 and 56 are removably mounted in their respective channels 71 and 72 by a plurality of strap assemblies 61 (FIGS. 11, 15 and 16). Channels 71 and 72 are similar to channels 8 and 41 and, therefore, are not described in detail. Each strap assembly 61 includes a section of strap 62 which is located within a selected groove 57 and extends about the low-friction strip and its respective channel member and is tightened by a usual screw clamp 63.

Another feature of the invention is the mounting of belt retainer blocks 64 and 65 on the ends of the troughing and return channel members 8, 41, 71 and 72. Blocks 64 and 65 preferably are formed of the same low-friction UHMW material as strips 25, 50, 55 and 56. Return belt retainer blocks 65 each have a generally rectangular configuration and are secured to the ends of strips 50 and 56 (FIGS. 7 and 10) by a pair of screws 66. Alternatively blocks 65 may be molded integrally with the low-friction strip of UHMW material or heat welded to the ends thereof. The upper end 67 of each block 65 has a somewhat triangular or truncated configuration so that only a small strip-like surface 68 is exposed for possible contact by the edges of conveyor belt 1 (FIG. 13).

Likewise, the upper end 69 of troughing run retainer blocks 64 (FIGS. 11 and 12) also have a somewhat triangular or truncated configuration so that a relatively narrow angled strip-like surface 70 is formed thereon for engagement with the edges of belt 1. Surface 70 has a predetermined angle whereby the belt edges will contact surface 70 throughout the length of the belt edge to provide a generally surface-to-surface contact therebetween and not a surface-to-point contact with a corner of the belt edge, which is undesirable.

Belt retainer blocks 64 and 65 are adapted for mounting on the idler assemblies shown in FIGS. 1–4, as well as the slotted low-friction material strip arrangement shown in FIG. 11. Thus, retainer blocks 64 of FIG. 11 may be mounted on channel ends 12 and 13 of troughing assembly 4 shown in FIGS. 2–4.

Figures 17, 18:
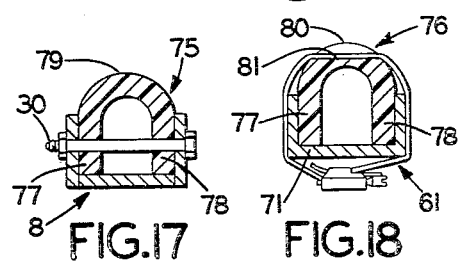
FIGS. 17 and 18 are sectional views similar to FIGS. 5 and 15, respectively, showing modified constructions of the low friction UHMW material strips.

Modified forms of the strip of low-friction UHMW polymer material are shown in FIGS. 17 and 18 and are indicated generally at 75 and 76, resepctively. Strips 75 and 76 have inverted U-shaped cross-sectional configurations in contrast to the solid configurations of strips 25, 50, 55 and 60. Strips 75 and 76 may be bent into their inverted U-shape from flat strips or sheets of the low-friction material (such as ⅜" thick sheets) or can be extruded directly into this U-shape. Sections of the U-shaped strip then are heated and formed into catenary curves when intended for use in troughing assemblies or remains in a striaght horizontal condition for use in return run idler assemblies.

Strips 75 and 76 are each formed by a pair of legs 77 and 78 which extend generally vertically upwardly from within their respective mounting channels 8 and 71. Rounded top surfaces 79 and 80 are formed integrally with legs 77 and 78 and extend therebetween to provide the sliding contact surface with the moving belt. Top surface 80 is formed with a plurality of grooves 81 similar to grooves 57, shown in FIGS. 12 and 13, to decrease the amount of surface area contacting the moving conveyor belt. The components for mounting strips 75 and 76 on their respective channels are similar to those described above, and therefore, are not discussed in detail.

One of the important features of the invention is the mounting of a rigid strip of low-friction material formed of a UHMW polymer, preferably polyethylene, on a rigid supporting member such as a U-shaped channel, which supporting member in turn is mounted on or suspended from a supporting bracket, and in which the upper troughing run strip and its supporting member have complementary catenary configurations with the return strip and its supporting member having horizontal configurations. The exposed rounded top surfaces 29 and 53 of strips 25 and 50, surfaces 59 and 60 of strips 55 and 56, and surfaces 79 and 80 of strips 75 and 76, provide a relatively small area of low-friction material which slidably supports the moving surface of the conveyor belt. Furthermore, the belt supporting members, each consisting of the channel and low-friction strip, are fixed on their respective supports so as to be free of rotation with respect thereto, whereas most known idler constructions require bearings or similar rotatable mounting arrangements in order to provide the low-friction interface between the idler support and belt surface.

The grooved or slotted strip configuration provides even smaller contact surface areas between the low-friction strips and the belt surfaces than that of the continuous rounded top strip surfaces. Belt retainer blocks 64 and 65, or side rollers, provide the further advantage of preventing a conveyor belt from moving sideways too great of a distance on its supporting strips, which sideways movement increases the friction and drag on the belt and could possibly result in a belt breakage or conveyor shutdown should the belt experience excessive sideways movement. The retainer blocks are formed of a rigid, compact, solid block of the low-friction material which is able to withstand large forces without breakage or damage. The triangular or truncated upper end configuration of the blocks present relatively small surface areas which are engaged by the belt edges to reduce further the friction and drag on the belt. The retainer blocks also may be rollers of UHMW material.

Another important feature of the improved idler assemblies is the ease by which strips 25, 50, 55, 60, 75 and 76 may be removed from their respective mounting channels for replacement should they become damaged or excessively worn. Bolts 30 or straps 61 need only be temporarily removed for replacement of the particular low-friction strip. The strip supporting channels 8, 41, 71 and 72 can be mounted by various support brackets other than the spaced vertical post 5 and J-hooks 37, shown in the drawings, in order that they may be utilized in existing conveyor systems so as to be compatible with such components. Likewise, the particular pin mounting arrangement (FIG. 3) of upper troughing channel 8 and the slip-fit mounting of channel member 41 on J-hooks 37, enable these supporting channels to be removed easily and replaced with similar channels should they become damaged.

Although various other types of materials may be used satisfactorily in the formation of strips 25, 50, 55, 56, 75 and 76, the UHMW polyethylene having the physical properties set forth above has been found to be the most suitable and the preferred material.

Accordingly, the improved belt conveyor idler construction described above and shown in the drawings provides an extremely simple and inexpensive mechanism for slidably supporting a conveyor belt and the load being carried thereby, without any rotatable or moving parts that heretofore required constant maintenance and lubrication, and which provides a surface having a low coefficient of friction for sliding engagement with the belt being supported thereby.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the belt conveyor idler is constructed and used, the characteristics of the construction, and the advantageous, new and useful results obtained; the new and useful structures, devices, elements, arrangements, parts, and combinations, are set forth in the appended claims.

I claim:

1. Idler construction for slidably supporting a conveyor belt including:
    (a) rigid channel means adapted to extend transversely across the path of a conveyor belt, said channel means having walls forming a slot therebetween;
    (b) bracket means supporting the channel means in a fixed nonrotatable position;
    (c) a strip of a low-friction rigid material firmly seated within the slot of the channel means and extending generally throughout the length of said channel means;
    (d) said strip having a top surface projecting above the walls of the channel means to slidably engage and support a conveyor belt; and
    (e) fastening means removably seating the strip of low-friction material in the slot of the channel means.

2. The construction defined in claim 1 in which the low-friction strip of material is an ultra-high molecular weight polyethylene.

3. The construction defined in claim 1 in which the channel means and strip of low-friction material have complementary concave configurations generally similar to a catenary curve formed by the conveyor belt.

4. The construction defined in claim 1 in which the strip of low-friction material has a coefficient of friction in the range of 0.11–0.20.

5. The construction defined in claim 1 in which belt retainer means is mounted on each end of the strip of low-friction material and projects upwardly above the top surface of said strip to prevent transverse movement of a conveyor belt beyond the ends of the strip.

6. The construction defined in claim 5 in which the retainer means are formed of a low-friction material similar to the material of the low-friction strip.

7. The construction defined in claim 6 in which the retainer means includes a base and an integral top portion; and in which the top portion has a generally truncated configuration with a narrow belt edge engaging surface being formed thereon.

8. The construction defined in claim 1 in which the bracket means includes a pair of spaced vertical posts having pin receiving openings formed therein; in which pin means is mounted on each end of the channel means;

and in which the pin means are slidably received in the pin receiving openings of the posts for mounting the channel means thereon.

9. The construction defined in claim 1 in which a plurality of grooves are formed in the top surface of the strip of low-friction material and extend transversely with respect to said strip of material.

10. The construction defined in claim 1 in which the strip of low-friction material has an inverted U-shaped cross-sectional configuration formed by a pair of spaced vertically extending legs and a top surface formed integrally with said legs and extending therebetween, with said integral top surface being the belt engaging top surface of said strip.

11. Idler construction for slidably supporting a conveyor belt including:
   (a) rigid channel means having a U-shaped cross-sectional configuration adapted to extend transversely across the path of a conveyor belt;
   (b) bracket means supporting the channel means in a fixed nonrotatable position;
   (c) a strip of a low-friction rigid material seated within the channel means and extending generally throughout the length of said channel means;
   (d) said strip having a cross-sectional configuration formed by a flat bottom surface, a pair of spaced vertical side surfaces and a rounded convex top surface extending between said side surfaces, said top surface being adapted to slidably engage and support the conveyor belt; and
   (e) fastening means removably securing the strip in the channel means.

12. Idler construction for slidably supporting a conveyor belt including:
   (a) rigid channel means adapted to extend transversely across the path of a conveyor belt;
   (b) bracket means supporting the channel means in a fixed nonrotatable position;
   (c) a strip of a low-friction rigid material mounted on the channel means and extending generally throughout the length of said channel means;
   (d) said strip having a rounded top surface adapted to slidably engage and support the conveyor belt;
   (e) belt retainer means mounted on each end of the strip and projecting upwardly above the top surface of said strip to prevent transverse movement of a conveyor belt beyond the ends of said strip, said retainer means being formed of a low-friction material similar to the material of the low-friction strip; and
   (f) the retainer means having a base and an integral top portion, said top portion having a generally truncated configuration with a narrow belt edge engaging surface being formed thereon.

* * * * *